US011799355B2

(12) United States Patent
Kuhn et al.

(10) Patent No.: US 11,799,355 B2
(45) Date of Patent: *Oct. 24, 2023

(54) BRAKING DEVICE FOR AN ELECTRIC DRIVE MOTOR

(71) Applicant: Dewertokin Technology Group Co., Ltd., Jiaxing (CN)

(72) Inventors: Christian Kuhn, Lemgo (DE); Christian Müller, Rahden (DE); Sven Müller, Kirchlengern (DE)

(73) Assignee: DewertOkin Technology Group Co., Ltd, Jiaxing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,311

(22) Filed: Jun. 16, 2022

(65) Prior Publication Data

US 2022/0311308 A1    Sep. 29, 2022

Related U.S. Application Data

(62) Division of application No. 15/748,043, filed as application No. PCT/EP2015/081152 on Dec. 23, 2015, now Pat. No. 11,411,464.

(30) Foreign Application Priority Data

Jul. 28, 2015    (DE) .................... 20 2015 103 948.4

(51) Int. Cl.
*H02K 7/102*    (2006.01)
*H02K 7/10*    (2006.01)
(Continued)

(52) U.S. Cl.
CPC .............. *H02K 7/102* (2013.01); *F16D 59/00* (2013.01); *F16D 65/06* (2013.01); *F16D 65/18* (2013.01);
(Continued)

(58) Field of Classification Search
CPC .......... H02K 7/102; H02K 7/08; F16D 7/021; F16D 49/08; F16D 59/00; F16D 65/06; F16D 65/18; F16D 2121/14
See application file for complete search history.

(56) References Cited

U.S. PATENT DOCUMENTS 2,490,456 A    12/1949  Niederhiser
3,826,934 A    7/1974   Leach
(Continued)

FOREIGN PATENT DOCUMENTS

CN    101994826 A    3/2011
CN    203827112      9/2014
(Continued)

*Primary Examiner* — Bradley T King
(74) *Attorney, Agent, or Firm* — Henry M. Feiereisen LLC

(57) ABSTRACT

The invention relates to a braking mechanism (10) for an electric drive motor (1), in particular a drive motor (2) comprising an armature shaft (5) that protrudes from a motor housing (2); the braking mechanism (10) comprises at least one braking element (17) and an energy store, the energy store permanently applying a braking power to a frictional surface of the braking element. The braking mechanism (10) is characterized in that the energy store and the braking element (17) are made of the same material as a single piece.

19 Claims, 17 Drawing Sheets

(51) Int. Cl.
*F16D 59/00* (2006.01)
*F16D 65/06* (2006.01)
*F16D 65/18* (2006.01)
*H02K 7/08* (2006.01)
*F16D 121/14* (2012.01)

(52) U.S. Cl.
CPC ............... *H02K 7/08* (2013.01); *H02K 7/10* (2013.01); *F16D 2121/14* (2013.01); *F16D 2200/0004* (2013.01); *F16D 2200/0021* (2013.01); *F16D 2200/0034* (2013.01)

(56) References Cited

U.S. PATENT DOCUMENTS

| | | | |
|---|---|---|---|
| 6,038,739 | A | 3/2000 | Katoh |
| 6,256,838 | B1 | 7/2001 | Lu |
| 6,376,948 | B1 | 4/2002 | Li-Yang |
| 6,740,997 | B1 * | 5/2004 | Chen ................ H02K 7/102 310/77 |
| 6,814,209 | B1 | 11/2004 | Acosta |
| 8,994,236 | B2 | 3/2015 | Heuver |
| 11,353,071 | B2 * | 6/2022 | Shao ................ F16D 63/006 |
| 11,411,464 | B2 * | 8/2022 | Kuhn ................ F16D 59/00 |
| 2002/0092130 | A1 | 7/2002 | Tseng |
| 2007/0138884 | A1 | 6/2007 | Mcmillan |
| 2008/0197634 | A1 | 8/2008 | Himmelmann |
| 2010/0125976 | A1 | 5/2010 | Kuo |
| 2013/0169088 | A1 * | 7/2013 | Wu ................ H02K 7/1166 310/77 |
| 2014/0242405 | A1 | 8/2014 | Palumbo |
| 2015/0267757 | A1 | 9/2015 | Garing |
| 2017/0370429 | A1 | 12/2017 | Onodera |
| 2022/0281124 | A1 * | 9/2022 | Goulet ................ B25J 19/0004 |

FOREIGN PATENT DOCUMENTS

| | | |
|---|---|---|
| DE | 20 2004 008 713 | 7/2004 |
| DE | 20 2004 008 714 | 7/2004 |
| EP | 1 556 630 | 8/2007 |

* cited by examiner

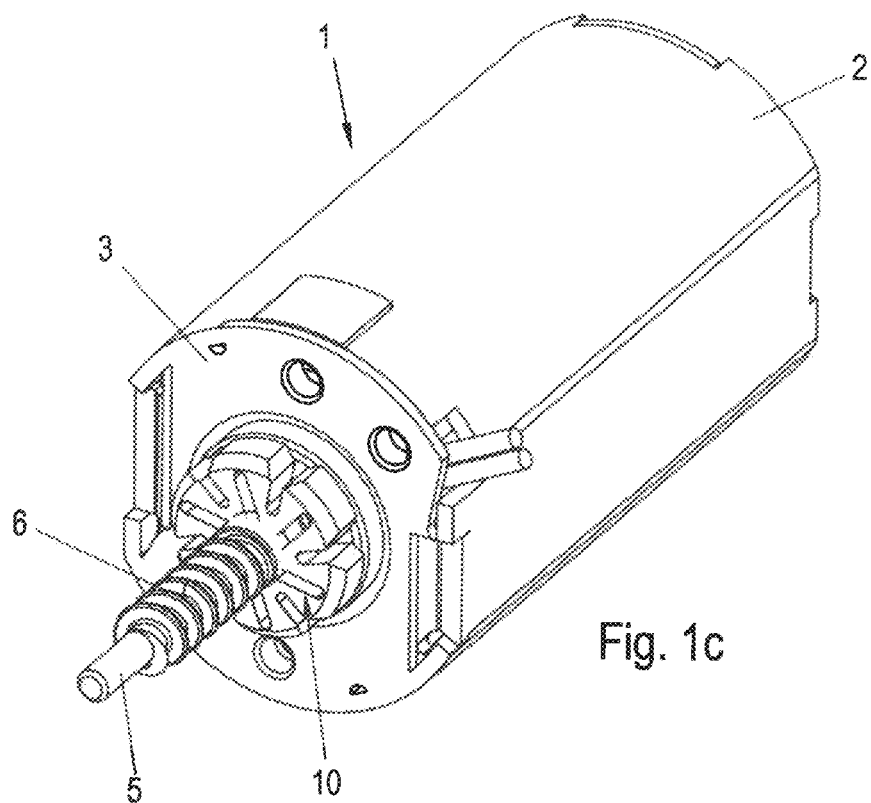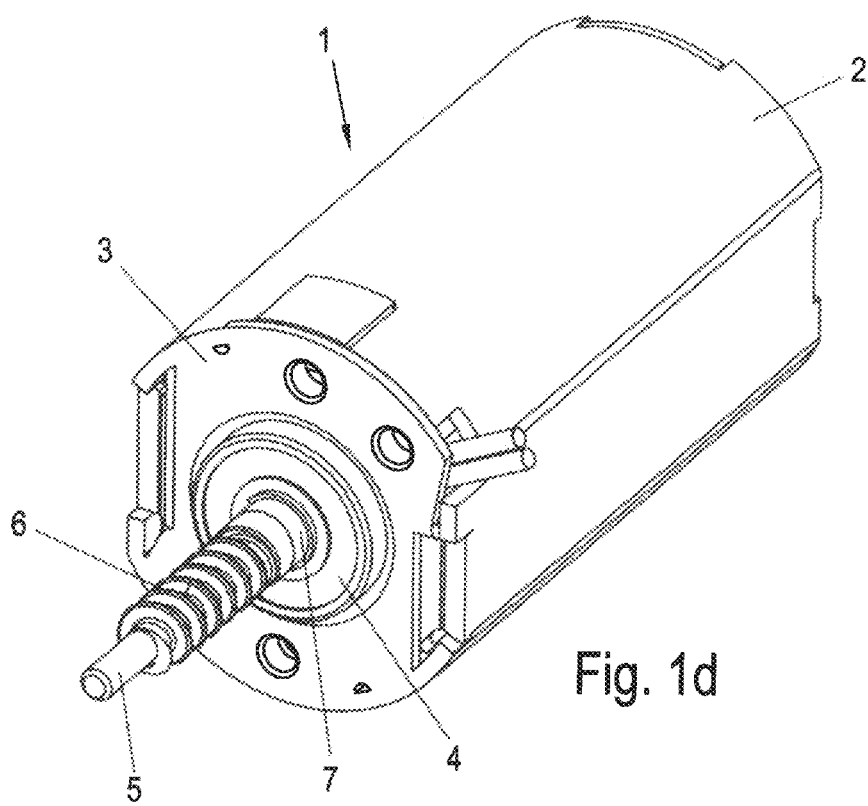

BRAKING DEVICE FOR AN ELECTRIC DRIVE MOTOR

CROSS-REFERENCES TO RELATED APPLICATIONS

This application is a divisional of prior filed copending U.S. application Ser. No. 15/748,043, filed Jan. 26, 2018, the priority of which is hereby claimed under 35 U.S.C. § 120 and which is the U.S. National Stage of International Application No. PCT/EP2015/081152, filed Dec. 23, 2015, which designated the United States and has been published as International Publication No. WO 2017/016618 and which claims the priority of German Patent Application, Serial No. 20 2015 103 948.4, filed Jul. 28, 2015, pursuant to 35 U.S.C. 119(a)-(d).

The contents of U.S. application Ser. No. 15/748,043, International Application No. PCT/EP2015/081152, and German Patent Application, Serial No. 20 2015 103 948.4 are incorporated herein by reference in its entirety as if fully set forth herein.

BACKGROUND OF THE INVENTION

The invention relates to a braking device for an electric drive motor, in particular a drive motor with an armature shaft protruding beyond the motor housing, having at least one braking element and an energy storage device, wherein the energy storage device permanently applies a braking force on the braking element.

Such drive motors are used in many ways, inter alia in electrical furniture drives which are used to adjust a piece of furniture. The furniture part can be, for example, a headboard or footboard of a bed or chair. Often, the driving force of the drive motor is transmitted via a worm gear with downstream spindle drive onto the furniture part. The worm gear is formed by a worm mounted on or attached to the armature shaft of the drive motor in conjunction with a worm wheel, into which the worm engages. The worm transmission offers the advantage of self-locking, thus preventing a lowering of a weight-loaded furniture part when the motor is off.

Particularly in the care sector, high demands are placed on self-locking. Even with an unfavorably positioned patient a headboard or footboard of a hospital bed is not permitted to lower. To meet these high demands, it may be necessary to provide a braking device in addition to the self-locking by the worm gear, which braking device brakes the armature shaft of the motor when the motor is stopped and thus prevents lowering of the furniture part.

Such braking devices can be designed as actively controllable brakes, for example, which, when actuated electromechanically, brake the armature shaft of the motor at a standstill.

Alternatively, not actively controlled brakes can be used for an armature shaft of an electric drive motor. Such brakes are known from the publications DE 20 2004 008 713 U1 and DE 20 2004 008 714 U1. In these braking devices, a slight permanent braking of the armature shaft occurs, which is overcome by the torque during operation of the drive motor, but which in standstill in conjunction with self-locking is still sufficiently large to prevent an inadvertent rotation of the electric drive motor by loading of the adjustable furniture part.

The braking devices initially mentioned and presented in the cited documents each have an energy storage device such as a spring, which permanently apply a braking force to a braking element. As a result of the braking force, the braking element is pressed against a braking runner for example, which is non-rotatably in communication with the armature shaft of the motor.

The aforementioned permanent braking devices have proven themselves and are simpler in their structure compared to actively controlled braking devices and therefore more cost-effective. However, they are still difficult to produce, since it must be ensured that the energy storage device and the braking elements consisting of different materials are securely connected to each other, without increasing the manufacturing cost.

SUMMARY OF THE INVENTION

It is therefore an object of the present invention to provide a braking device of the type mentioned, which is simple and therefore inexpensive in construction and offers long service life with reliable function.

This object is achieved by a braking device with the features of the independent claim. Advantageous embodiments and further developments are specified in the dependent claims.

A braking device according to the invention of the initially mentioned type is characterized in that the energy storage device and braking element are integrally made of the same material. The invention is based on the fundamental concept that with appropriate shaping the braking element itself can achieve a sufficient spring action to apply a required braking force.

In an advantageous embodiment of the braking device, it is formed in annular manner, wherein a self-contained annular body has a central opening for receiving a portion of the armature shaft of the drive motor. Incisions which extend radially and/or inclined and are inwardly and/or outwardly open are preferably introduced into the base body. Since the body is circumferentially self-contained, it can exert a radially acting braking force from itself, without any support on external components, on the armature shaft guided through the central opening.

Through the incisions, the material thickness of the annular base body is reduced, so that it can be easily widened, thus achieving a spring effect. The number and depth of the incisions makes it possible to set the desired spring force and the spring travel for the material used in the body. Thus, a material which is relatively hard and in itself is not particularly elastic can be used for the base body, which, in spite of the applied braking effect, wears little and nevertheless gives a spring action with sufficient spring travel and a required spring force which in particular is not too strong. Several incisions may preferably be arranged in a star shape. Open incisions can preferably alternate circumferentially inwardly and outwardly.

As the material of the base body, zinc or bronze or a high-temperature-resistant plastic such as PEEK (polyether ether ketone) can be used for example. The materials mentioned are usually softer than the commonly used material of the armature shaft, namely solid, unhardened steel, so that braking of the armature shaft does not lead to damage to the surface of the armature shaft. Nevertheless, the materials mentioned are hard enough to achieve a braking effect as wear-free as possible and thus for a long life cycle.

Said braking device, in its annular configuration, can be placed on the armature shaft in a simple and space-saving manner abutting the motor housing or be inserted into a receptacle in the motor housing. In order to fix the braking device, it is merely necessary to prevent axial slippage of the motor shaft, which can be achieved by holding or latching projections. Furthermore, the braking device must be secured against rotation, which, for example, can also take place by latching or holding projections arranged on the motor housing. These projections can, for example, engage in said incisions in the base body of the braking device. Alternatively, projections may be arranged on the outer circumference of the base body, which interact with said holding or latching projections and non-rotatably fix the braking device to the motor housing. The holding or latching projections can be arranged or formed on the motor housing itself or on a motor holder.

Particularly advantageously, a surface of the at least one braking element itself forms the friction surface. In this way, a particularly simple construction of the braking device is achieved, in particular if the braking element is made of plastic in an injection-molding process.

Alternatively, however, it is also possible to apply an additional ring segment to the at least one braking element facing the central opening. In this case, a surface of the ring segment forms the friction surface. Thus, regardless of the material of the base body, a friction surface which is particularly suitable for braking can be provided.

In a further advantageous embodiment, the braking device is formed integrally with a motor holding plate. As a result, manufacturing and assembly costs of the electromotive drive are further reduced. Alternatively, the braking device can also be integrated in the electrical drive motor with the same advantage and in particular additionally assume the function of a sliding bearing for the drive shaft there. In particular, the rear journal bearing of a drive motor is often not designed as a ball bearing, but as a sliding bearing. The sliding bearing provided as a standard can be replaced by the braking device with sliding bearing function according to the invention.

In a further advantageous embodiment of the braking device, it is formed in an annular manner from a sheet metal material, preferably in an embossing process. Again, the braking device has an annular base body with a central inner opening for receiving the armature shaft. The base body has open incisions facing inwardly towards the central opening, by means of which intermediate spring tongues are formed. The spring tongues are bent toward the inner opening out of the plane of the annular base body, so that they have at their front end an axially extending portion, with which the spring tongues press radially onto an armature shaft guided through the central opening and thus exert a braking force. In this embodiment, the braking element can be fixed to the motor housing in a similarly simple and space-saving manner. The braking device is also made integrally, preferably from a thin and resilient sheet material. The spring force is achieved by the shaping of the projecting spring tongues which extend axially in their respective end portion.

BRIEF DESCRIPTION OF THE FIGURES

The invention will be explained in more detail below by means of embodiments with the aid of figures, wherein:

FIGS. 1a to 1c show in each case an isometric view of a drive motor with a braking device mounted on an armature shaft of the drive motor;

FIG. 1d shows an illustration of the drive motor of FIGS. 1a to 1c without braking device;

FIG. 9b shows an isometric sectional view of the braking device of FIG. 9a;

DETAILED DESCRIPTION OF PREFERRED EMBODIMENTS

Figure 1A:
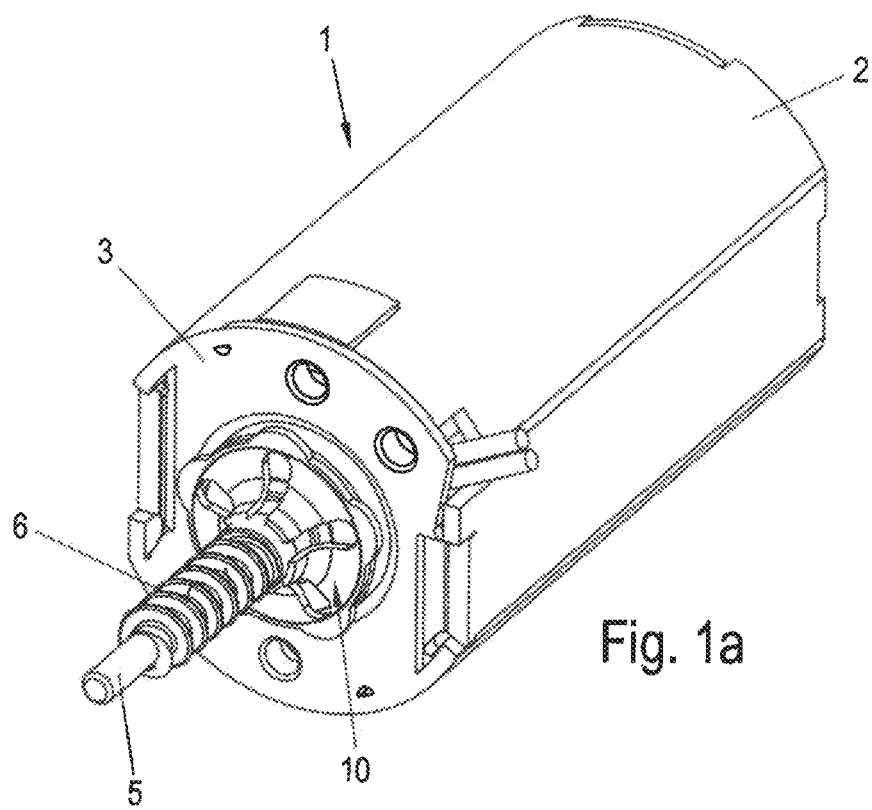
Figure 1B:
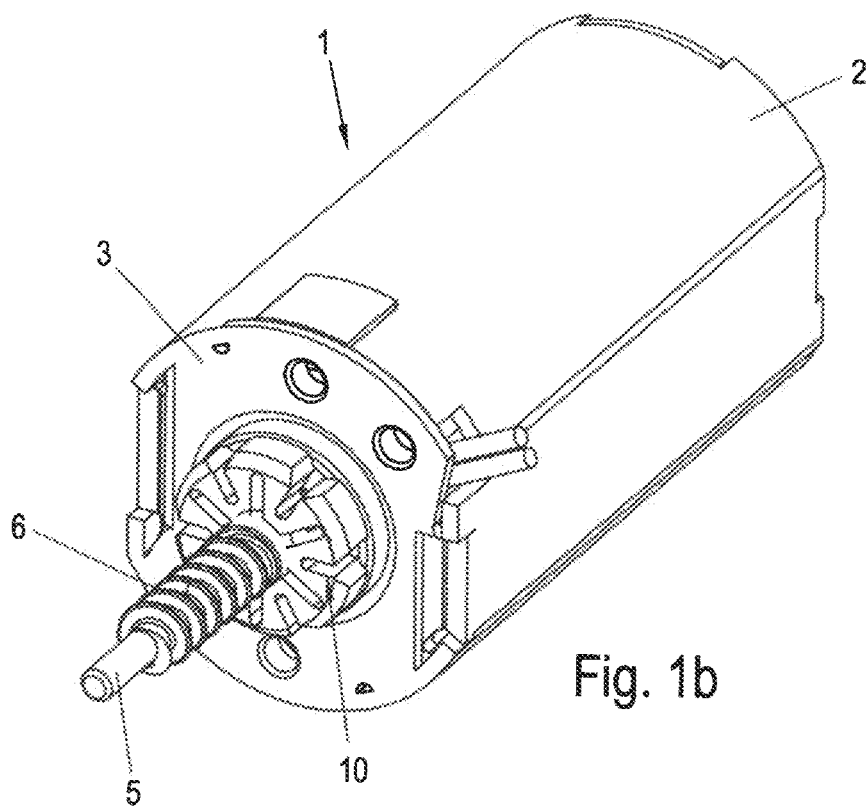

FIGS. 1a to 1c show in the same way an electric drive motor 1 with a braking device 10 in an isometric view. FIG. 1d shows in the same representation the drive motor 1 without a braking device.

The drive motor 1 in each case has a housing 2 with a flange plate 3, on which mounting possibilities for the drive motor 1 are present. Furthermore, a bearing 4 (see FIG. 1d) for an armature shaft 5 of the drive motor 1 is arranged centrally in the flange plate 3. The bearing 4 can be held in a bearing seat of the flange plate 3, either accessible from the outside or inserted from the inner side of the housing 2. On the oppositely disposed side of the housing 2, a comparable bearing for the armature shaft 5 is arranged. In the present case, the bearing 4 provided in the flange 3 is, for example, a rolling bearing, e.g. a ball bearing or a roller bearing. The bearing arranged on the opposite side can also be such a rolling element bearing or a sliding bearing.

The armature shaft 5 protrudes beyond the flange plate 3. In addition to an optional journal at the end of the armature shaft 5, it is provided with a worm 6. The worm 6 may be a separate part that is mounted on the armature shaft 5, or be formed integrally with the armature shaft 5. In the region of the bearing 4, the armature shaft 5 initially projects beyond the flange plate 3 with an axle section 7, before the worm 6 adjoins it. The axle section 7 is formed cylindrically with a smooth surface, wherein the diameter of the axle section 7 at least slightly exceeds the outer diameter of the worm 6.

As shown in FIGS. 1a to 1c, the braking device 10 is in each case formed in an annular manner and attached to the armature shaft 5 so far that it rests substantially on the flange plate 3 and acts on the axle section 7 of the armature shaft 5.

Figure 2A:
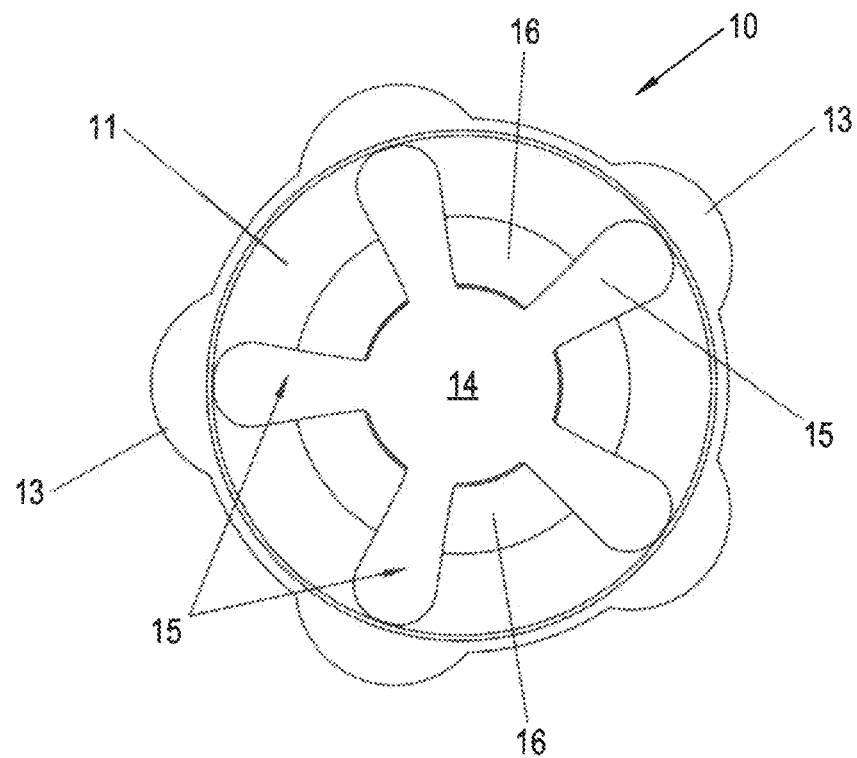
FIGS. 2a to 2c each show a top view and an isometric view of the braking element of FIGS. 1a to 1c.
Figure 2A:
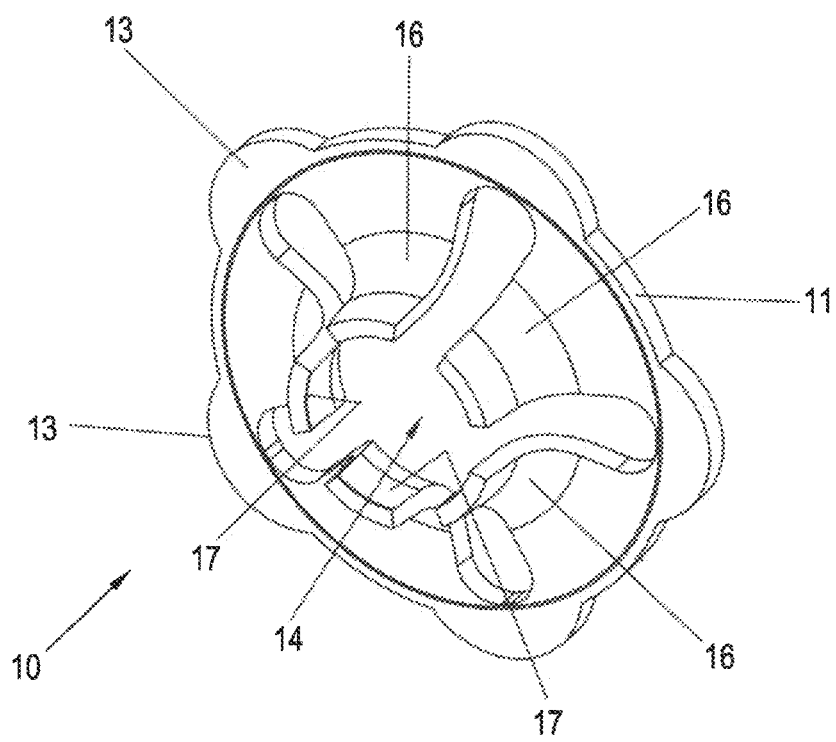
Figure 2B:
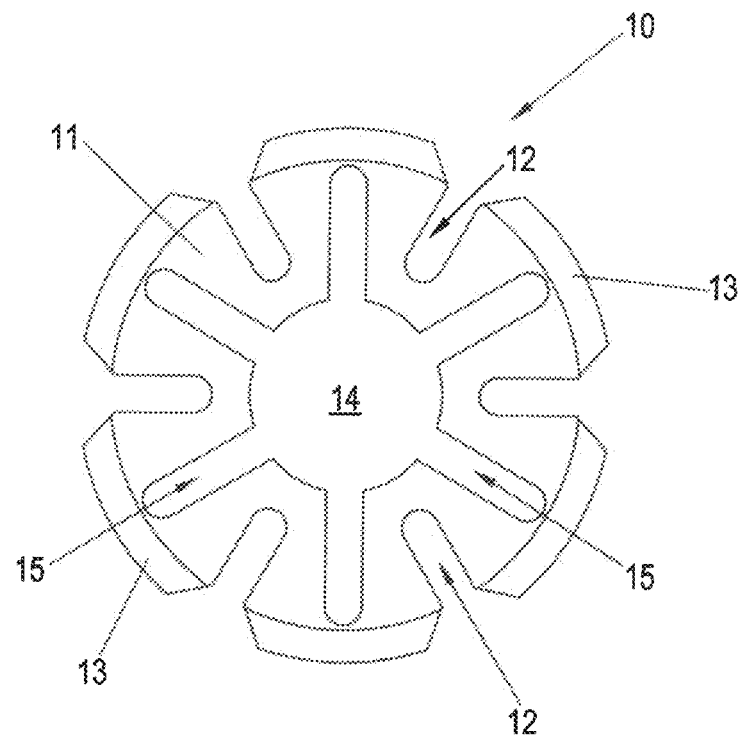
Figure 2B:
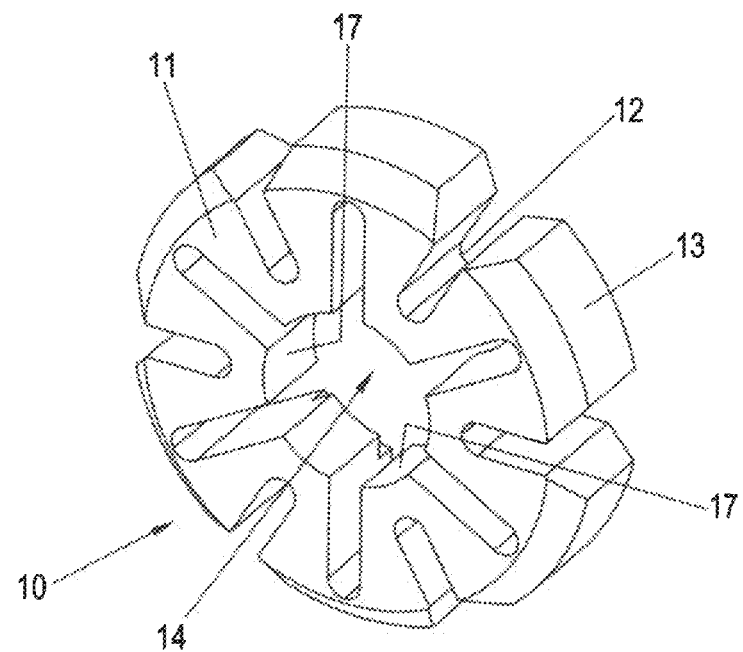
Figure 2C:
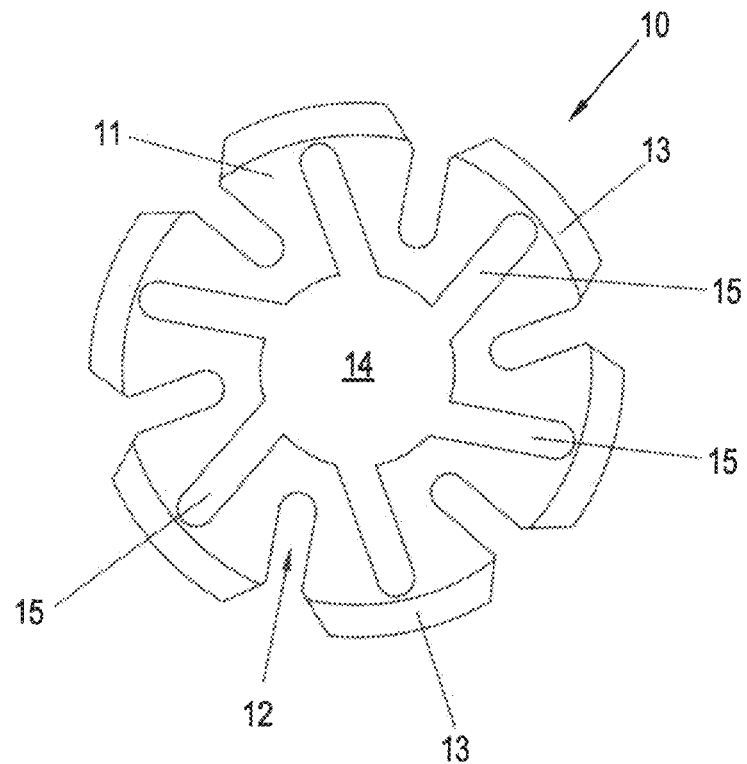
Figure 2C:
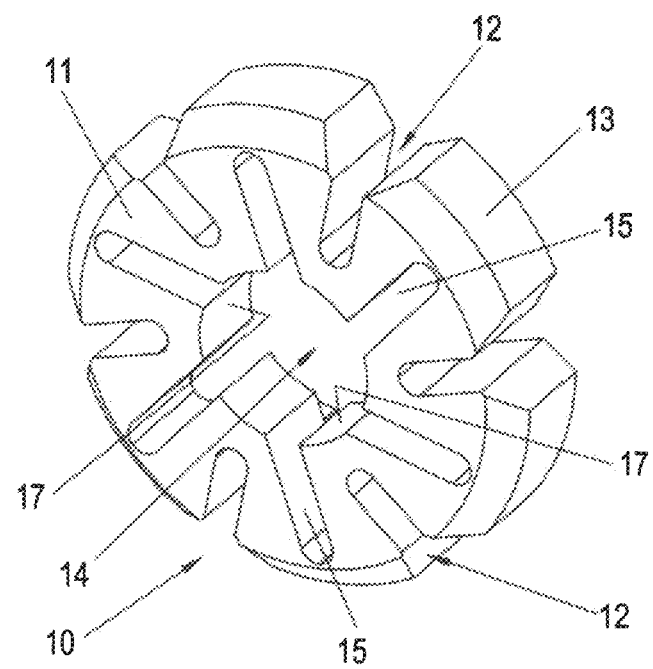

The three exemplary embodiments of the braking device 10 according to FIGS. 1a to 1c are shown in greater detail in FIGS. 2a to 2c. FIGS. 2a to 2c each show in their upper part a top view of the braking device 10 and in the lower part an isometric oblique view of the braking device 10.

In the embodiment of FIGS. 1a and 2a, the braking device 10 is manufactured integrally from an annular base body 11, in particular in a punching and bending or embossing process from a sheet metal element.

The material of the base body 11 is preferably a spring plate, for example a steel sheet or a sheet made of a spring bronze. The annular base body 11 is circumferentially closed in the outer area, so that it can exert radial forces out of itself on the armature shaft 5. Said shaft is guided through a central opening 14 in the base body 11, which forms an axle receptacle. At the outer periphery, the base body 11 comprises radially protruding sections 13, which alternate with sections of smaller diameter. With the aid of the radially protruding sections 13, the braking device 10 can be held in a rotationally fixed manner relative to the drive motor 1. For this purpose, holding or latching projections may be formed, for example, on the flange plate 3 of the drive motor 1, which projections hold the braking device 10 in a rotationally fixed manner on the one hand and fix the other in the axial direction on the flange plate 3 on the other hand. In the exemplary embodiments of FIGS. 1a to 1c, the flange plate 3 has no such holding or latching projections. Instead, fixing of the braking device 10 is provided via a motor mount, which is not shown here, to which the drive motor 1 is attached.

Incisions 15 are introduced into the base body 11 of the braking device 10 in a star-shaped manner, which are inwardly open towards the central opening 14. These incisions are also referred to below as inner incisions 15. Spring tongues 16 are formed by the inner incisions 15 from the base body 11 in the region of the central opening 14, which spring tongues are bent out of the plane of the base body 11 in the embossing process in such a way that they are aligned in a front free portion in the axial direction of the armature shaft 5, i.e. substantially perpendicular to the plane in which the outer circumferential portion of the body 11 is aligned.

These front sections of the spring tongues 16 press on the axle section 7 of the armature shaft 5 and thus brake the armature shaft 5. These sections form braking elements 17 of the braking device. The inwardly facing surfaces of the front braking elements 17 of the spring tongues 16 thus provide the friction surfaces, also called braking surfaces, of the braking device 10. As a result of the number of inner incisions 15 and thus the number of spring tongues 16 and the depth and width of the inner incisions 15, the braking effect of the braking device 10 can be predetermined in a defined manner. In the relaxed state of the braking device 10, the diameter of the central opening 14 is preferably smaller than the diameter of the axle section 7 of the armature shaft 5, so that the braking device 10 is seated with pretension on the axle section 7.

The braking device 10 shown in FIGS. 1b and 2b likewise has an integral base body 11. In the present case, it is not made from a thin sheet metal material, but from a solid material made of metal, e.g. zinc or bronze, or made of a hard and preferably heat-resistant plastic, such as PEEK (polyether ether ketone). The thickness of the base body 11 is in the present case in the range of a few millimeters and thus substantially corresponds to the length of the axle section 7 (see FIG. 1b).

Incisions 12 projecting from the outside to the inside are introduced into the base body 11, which are also referred to below as outer incisions 12. In the present case, six outer incisions 12 are provided, which are uniformly arranged in a star-shaped manner. Due to the outer incisions 12, radially projecting sections 13 remain from the base body 11 in the outer region, which can be used as in the braking device 10 of the first embodiment (see FIG. 2a) for rotationally fixed fixing of the braking device 10.

Inner incisions 15 are present offset to the outer incisions 12, which inner incisions intersect the base body 11 from the central opening 14 to the outside. Due to the outer and inner incisions 12, 15, the braking device 10 is provided with a spring action in the radial direction. Sections of the base body 11 remain between the inner incisions 15 in the region of the central opening 14, which sections press as braking elements 17 on the corresponding axle section 7 of the armature shaft 5. Again, comparable to the embodiment of FIG. 2a, the spring action of the base body 11 can be varied widely and thus adapted to the required needs by adjusting the number and depth of the inner incisions 15, but also the outer incisions 12.

In FIGS. 1c and 2c, another embodiment of the braking device 10 is shown. The braking device 10 corresponds in its basic structure to that of the second embodiment according to the FIGS. 1b and 2b. In contrast, the outer incisions 12 and the inner incisions 15 do not extend exactly radially in this case, but obliquely to the outside or inside. In alternative embodiments, it may be provided that only the outer or only the inner incisions 12, 15 are oblique, whereas the other type of incisions 12, 15 extend radially.

Due to the inclination of at least one type of the incisions 12, 15, an asymmetry in the braking behavior with respect to the direction of rotation of the armature shaft 5 relative to the braking device 10 is achieved. Depending on the direction of rotation of the armature shaft 5, a run-up or run-off effect on the braking elements 17 is achieved, by means of which the braking effect is amplified in one of the directions of rotation and is weakened in the other of the directions of rotation. Thus, it can be achieved for example that, in an electromotive furniture drive, the direction in which a lowering of the furniture part could occur as a result of increased weight is subjected to an increased braking effect.

Figure 3A:
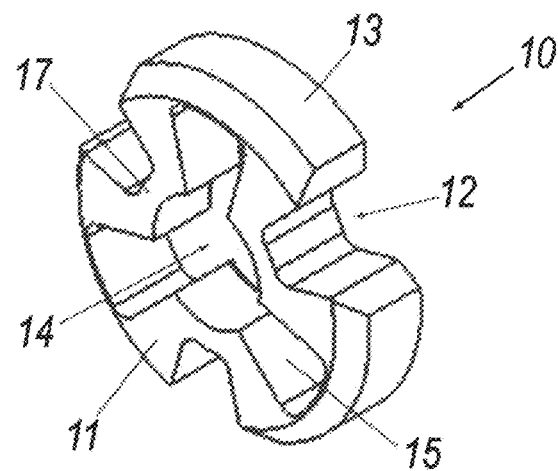
FIGS. 3a to 3c each show an isometric view of another embodiment of a braking device.
Figure 3B:
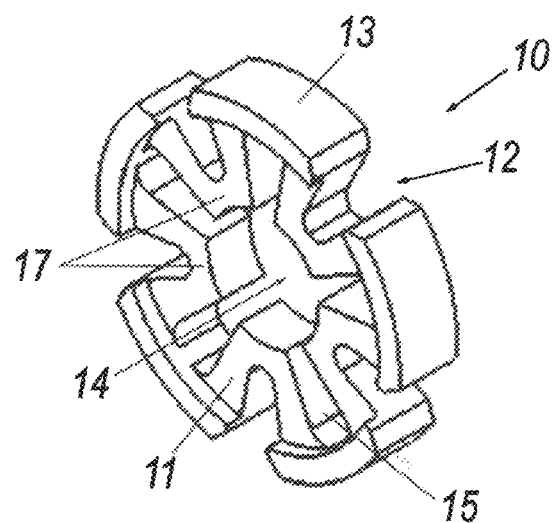
Figure 3C:
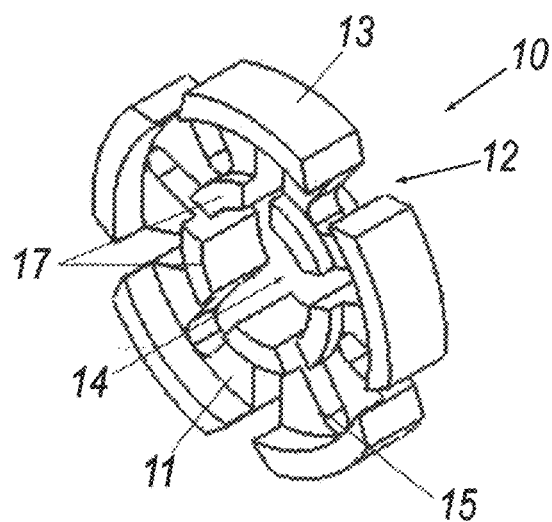

FIGS. 3a to 3c show three further exemplary embodiments of a braking device 10 according to the application, in each case in an isometric view. These braking devices 10 also correspond in their basic construction to those of the second exemplary embodiment according to FIGS. 1b and 2b, to the description of which reference is hereby explicitly made. Identical reference numbers designate similar or equivalently acting elements in these embodiments as in all of the following embodiments.

In the braking device 10 according to FIG. 3a, instead of the six braking elements 17 shown in the second embodiment, three braking elements 17 are provided and correspondingly also three inner incisions 15 and three outer incisions 12 are provided in each case. In principle, the braking device 10 shown could also be formed with only two braking elements 17, without the basic structure and the operation being different from each other (see also FIG. 13).

In the embodiments shown in FIGS. 3b and 3c, which in principle also correspond to the second embodiment according to FIGS. 1b and 2b, five braking elements 17 and correspondingly five inner sections 15 and outer incisions 12 are provided. In the embodiment of FIG. 3b, the base body 11 is thinner inside in the axial direction than at its outer edge. In the embodiment of FIG. 3c, the braking device 10 in turn has a greater thickness in the region of the braking elements, which may be selected, for example, equal to the thickness in the outer region.

With the illustrated profiling of the base body 11, it is possible to achieve a reduction in material and thus in cost on the one hand, and the acting spring forces can be influenced on the other hand.

Other parameters with which the spring force can be influenced are the overall diameter (outer diameter) of the braking device 10, the number of braking elements 17 and the inner and outer incisions 15, 12 and the depth of the inner and outer incisions 12, 15.

Figure 4:
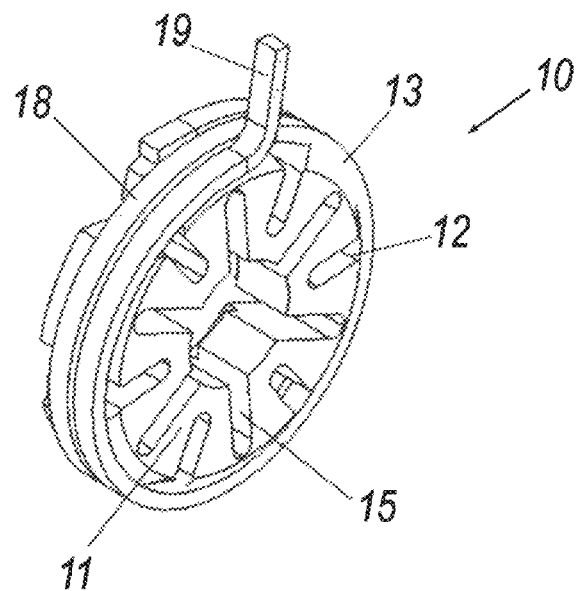
FIGS. 4, 5 each show an isometric view of another embodiment of a braking device.

FIG. 4 shows a further embodiment of a braking device 10 according to the application. In this braking device 10, another spring element is provided in addition to the spring effect of the base body in order to increase the braking force of the braking device 10.

In the case shown, the further spring element is a wrap spring 18, which is placed around the base body 11. In the illustrated embodiment, one end 19 of the wrap spring 18 is bent off. With this bent-off end 19, this side of the wrap spring can be fixed relative to the motor housing of the drive motor 1. The other end of the wrap spring 18 is free.

The base body 11 of the braking device 10 is fixed in the illustrated embodiment with respect to its rotational position only by the wrap spring 18. This leads to the consequence that during the co-rotation of the base body 11 the wrap spring 18 opens due to its internal spring force on the armature shaft 5 of the drive motor 1 in one rotational direction, as a result of which the base body 11 can co-rotate in the wrap spring 18. In the opposite direction of rotation, the wrap spring 18 contracts upon rotation of the base body 11, so that a braking action between the base body 11 and wrap spring 18 takes place, which also further compresses the base body 11 in addition to the internal spring force. Consequently, in this direction of rotation of the armature shaft 5 of the drive motor 1, a greater braking force is exerted from the braking device 10 on the armature shaft 5 than in the opposite direction of rotation described above. The illustrated braking device 10 thus has different braking effects on the drive motor 1 dependent on the direction of rotation.

According to the embodiment of FIG. 4, the wrap spring 18 comprises two wrap windings. In alternative embodiments, a (wrap) spring may also have only one or less than one turn or more than two wraps.

In an alternative embodiment of the braking device 10 according to FIG. 4, the outer incisions 12 and the inner incisions 15 in the base body 11 can be formed obliquely analogous to the embodiment according to FIG. 2c in order to further strengthen the dependence of the braking effect of the braking device 10 on direction of rotation.

Figure 5:
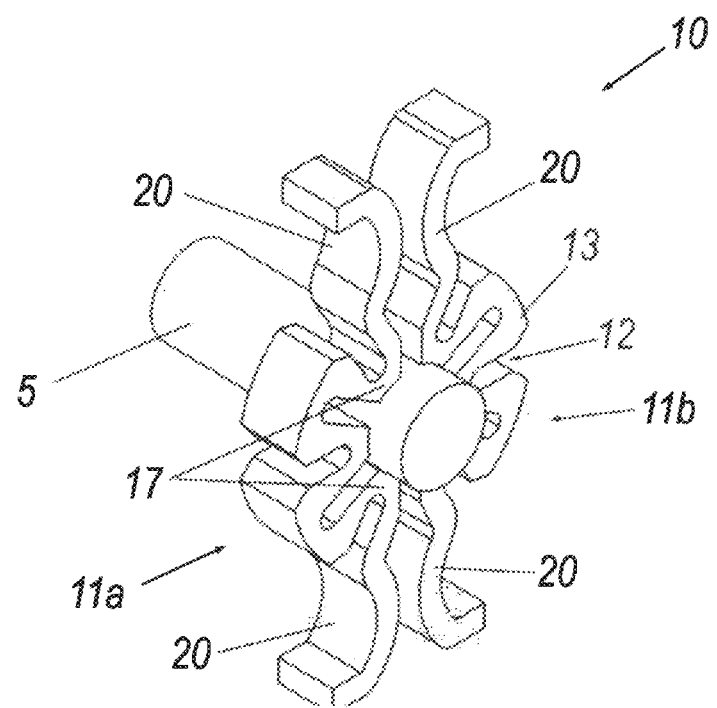

FIG. 5 shows another embodiment of a braking device 10 in an isometric view. Also in this embodiment, similar reference numerals designate the same or equivalently acting elements as in the previous embodiments.

In contrast to the previously presented braking device 10, the braking device 10 is constructed in two parts according to FIG. 5, in that the base body 11 is divided into two base body halves 11a, 11b. Each of the halves encloses a segment of the armature shaft 5 with a resilient arrangement of two respective outwardly projecting sections 13 and three braking elements 17. The respective outer braking elements 17 merge into spring arms 20. The base body halves 11a, 11b are pressed by means of the spring arms 20 on the axle 15. Depending on the applied pressure, the braking effect of the braking device 10 can be varied.

Alternatively and not shown in detail here, an enclosing spring, e.g. according to the type of wrap spring according to FIG. 4, can also be provided to increase the braking force.

Figure 6A:
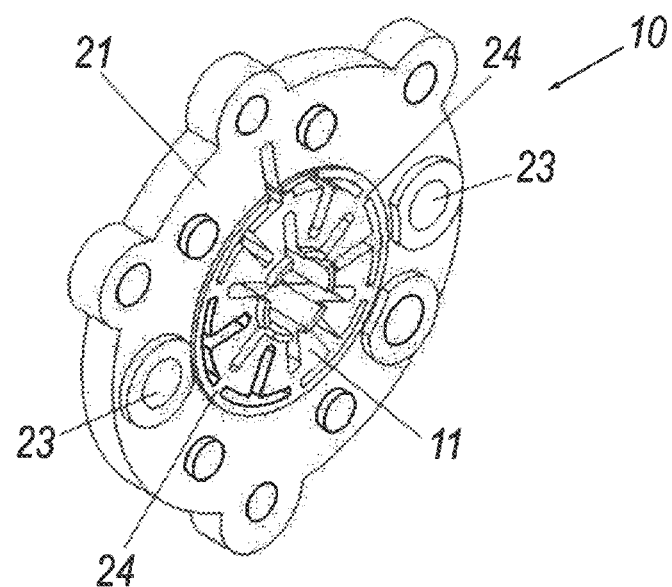
FIGS. 6a, 6b each show an isometric view or a top view of a further embodiment of a braking device.
Figure 6B:
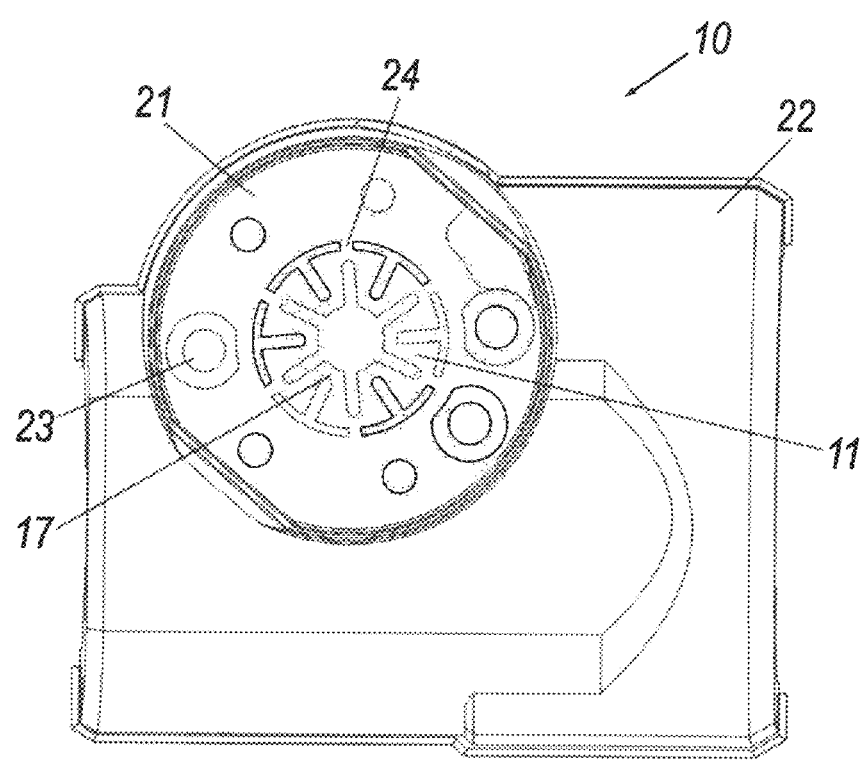

In FIGS. 6a and 6b, a further embodiment of a braking device 10 is shown in each case. In both cases, the braking device 10 is integrally formed with a motor attachment, specifically in the embodiment of FIG. 6a integral with a motor bearing plate 21 and in the embodiment of FIG. 6b integral with a motor bearing shell 22, which encloses the motor support plate 21. In both cases, the motor bearing plate 21 is used to attach a drive motor, e.g. the drive motor 1 shown in FIG. 1d, which abuts the motor bearing plate 21 with its flange 3. The motor bearing plate 21 has mounting holes 23, by means of which screws can be screwed into corresponding threaded holes of the flange plate 3 of the drive motor 1.

A braking device 10 is centrally integrated in the motor bearing plate 21 and thus also in the motor bearing shell 22. The braking device 10 is formed analogously to the braking devices shown in FIGS. 2a-c and 3a-c and is held by lateral webs 24 in the motor bearing plate 21 and the motor bearing shell 22.

The motor bearing plate 21 or motor bearing shell 22 and the base body 11 of the braking device 10 and the webs 24 are integrally made from the same material, e.g. in a common injection-molding process. In alternative embodiments, it is possible to use a two-component injection-molding process, wherein the motor bearing shell 22 and the motor bearing plate 21 and the braking device 10 are produced in common injection-molding step, but are made of different materials. In this way, regardless of the material of the motor bearing shell 22 and the motor bearing plate 21, a material can be used for the braking device 10 which is suitable in view of the spring action and the braking effect.

The motor bearing plate 21 and the motor bearing shell 22 may be formed as part or as a section of a housing of the electromotive drive or as part or section of a transmission of the electromotive drive.

Figure 7:
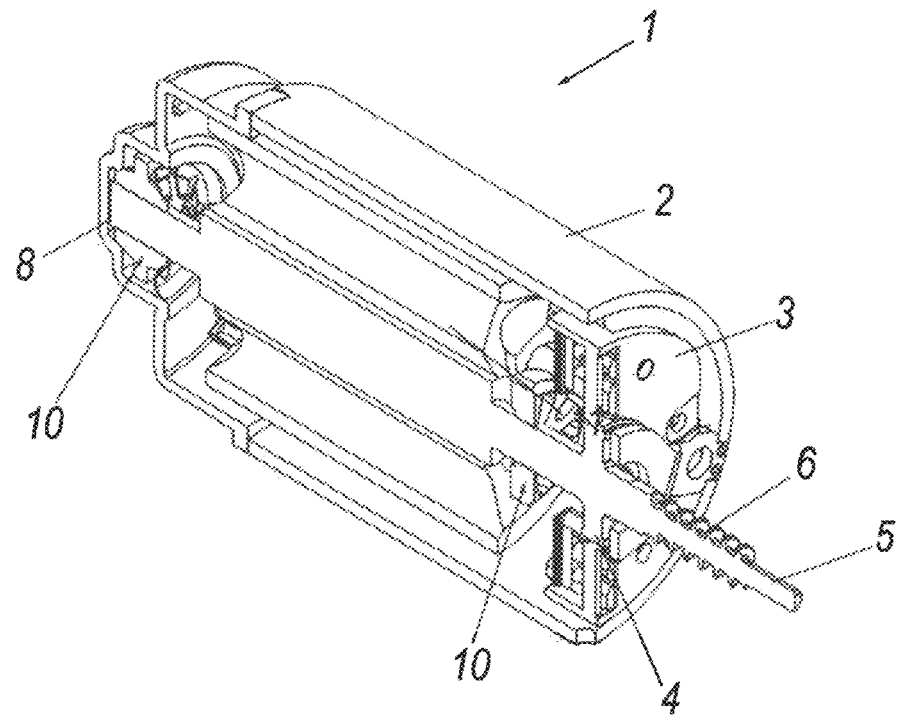
FIG. 7 shows a sectional view of a drive motor with integrated braking devices.

FIG. 7 shows a drive motor 1 with integrated braking devices 10. The drive motor 1 is shown in this illustration in an isometric manner and in intersection along its axle shaft 5. Two braking devices 10 are integrated into the motor in the illustrated embodiment. A first braking device 10 is arranged in the region of a front bearing 4. This braking device 10 may be formed, for example, according to the FIG. 2b, 2c or 3a to 3c. Another braking device 10 is arranged in a bearing dome 8 on the rear motor side opposite the worm 6. It may be provided in alternative embodiments to integrate only one of the braking devices 10 in the drive motor 1.

In the illustrated embodiment, the braking device 10 arranged in the rear motor region additionally assumes the function of a rear motor armature shaft bearing. Such a rear motor armature shaft bearing is often designed as a sliding bearing because of the relatively low occurring radial forces. The braking device 10 assumes the sliding bearing function, but with the higher sliding friction compared to a normal sliding bearing, as provided for by the application.

Advantageously, the assembly effort of the drive motor 1 with integrated braking device 10 is identical to such with sliding bearings, wherein also a heat generation by the braking device 10 is kept away from the screw 6 and the associated transmission.

In an alternative embodiment of the embodiment of FIG. 7 it may be provided to separate the sliding bearing from the braking device and to place the braking device 10, in addition to a sliding bearing, on the armature shaft 5 in the rear region of the motor.

Although the braking devices 10 shown above are suitable and designed in principle for a permanent braking of the armature shaft 5 of the drive motor 1, they can nevertheless be easily expanded into an actuatable brake.

Figure 8A:
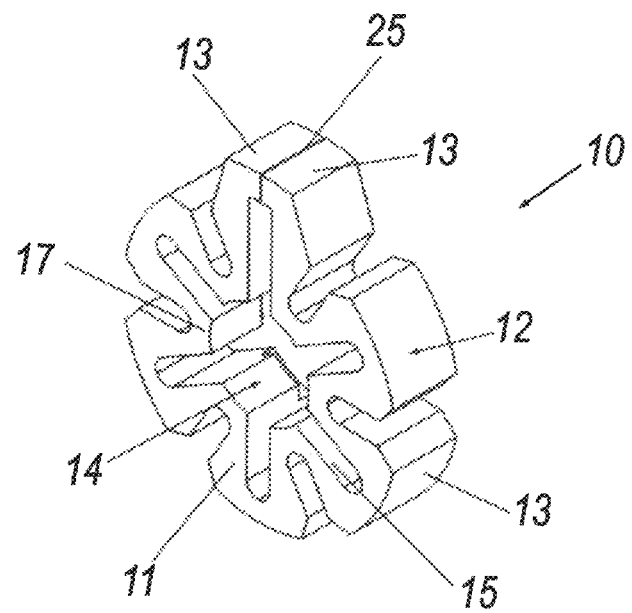
FIG. 8a shows an isometric view or a top view of a further embodiment of a braking device.

FIG. 8a shows an embodiment of a braking device 10, the braking effect of which can be adjusted externally. With respect to its basic structure, the braking device 10 of FIG. 8a corresponds to one of the braking devices shown in FIG. 2b, 2c or 3a to 3c. In the embodiment of FIG. 8a, the base body 11 is separated by an incision in the corresponding protruding section 13 in extension of one of the inner incisions 15, so that a gap 25 is formed. Due to the incision or gap 25, the base body 11 of the braking device 10 can be widened or compressed during operation, as a result of which the braking forces exerted by the braking device 10 on an inserted armature shaft 5 can be changed. In order to be able to exert a force more easily on the sections of the base body 11 adjacent to the gap 25, these may be formed radially longer than the other sections of the body 11.

Figure 8B:
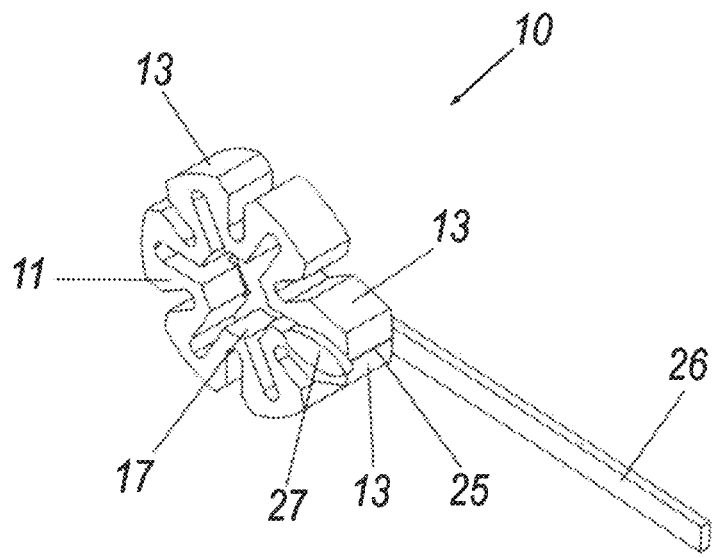
FIGS. 8b, 8c each show an isometric view of the braking device of FIG. 8a with an actuating lever in different positions.
Figure 8C:
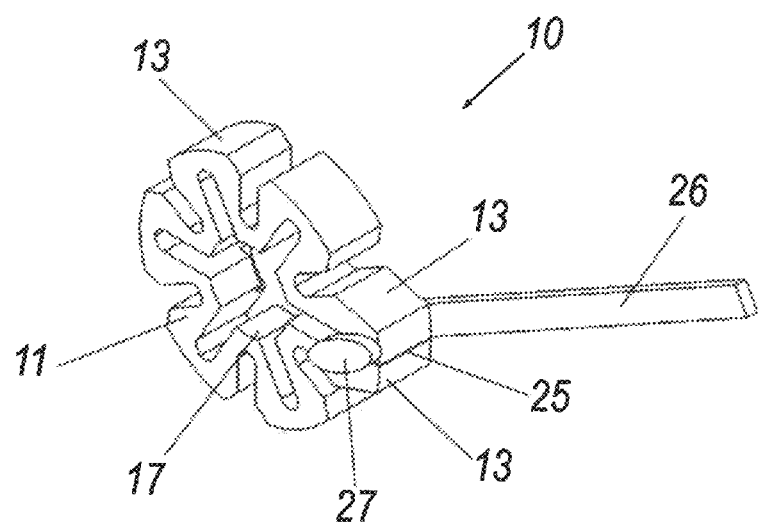

In all of the aforementioned examples, but especially in the braking devices 10 according to FIG. 8a, at least one rotatable eccentric cam 27 can be arranged in at least one of the inner or outer incisions 12, 15, as shown in FIGS. 8b and 8c. The rotatable cam 27 may be attached, for example, at the end of a rotary actuating lever 26 which is pivoted on its part to turn or pivot the cam 27. The cam 27 is longer in cross-section in one direction than in a direction transverse thereto. In this elongated direction, the cam 27 is aligned in a rest position, which is shown in FIG. 8b, parallel to the orientation of the incision 12, 15, in which it is arranged. The cam is dimensioned so that in the rest position it is not in engagement with side walls of the incision 12, 15. Upon rotation of the cam 27 out of the rest position, if therefore the cam 27 "stands transversely" in the incision 12, 15, the cam comes with its side flanks into engagement with the side walls of the incision 12, 15 and levers it up. This position of the cam 27 by actuating the rotary actuating lever 26 is shown in FIG. 8c. By levering up the incision 12, 15 against the spring action, which is possessed by the base body 11 of the braking device 10, the braking force exerted by the braking elements 17 on the axle 7 is reduced and the brake is thus released.

It may be provided that the cam 27 is formed in such a narrow manner in a direction transverse to the direction in which it is lunged that it can be inserted in the rest position into the incision 12, 15, as shown in FIGS. 2b and 2c, 3a to 3c or 8a. However, it can also be provided to form the incision 12, 15 in the region of the cam in a slightly widened manner. In this way, a centering of the cam within the incision 12, 15 is achieved. The cam thus does not slip out of the incision 12, 15 even in the rest position.

The described actuation of the braking device 10 via the described cam 27 may be used for example to allow quick adjustment of the furniture drive via an external force and optionally an emergency adjustment in the de-energized state of the furniture drive. For this purpose, for example, the rotary actuating lever 26 which carries the cam 27 can be actuated directly or manually via a rod assembly from the outside of the housing of the furniture drive. For power transmission, a Bowden cable is also suitable in addition to a rod assembly.

Assuming that the transmission of a furniture drive which is downstream of the drive motor, e.g. the worm gear and a spindle drive, shows such a low level of self-locking that after canceling the braking effect of the braking device 10 a manual adjustment of the furniture part can take place, the braking device 10 thus released 10 can be used for quick adjustment or emergency adjustment.

In addition to the described cam 27, an eccentric or wedge or pincer mechanism engaging in one of the incisions 12, 15 can generally be used to release the braking device 10.

Figure 9A:
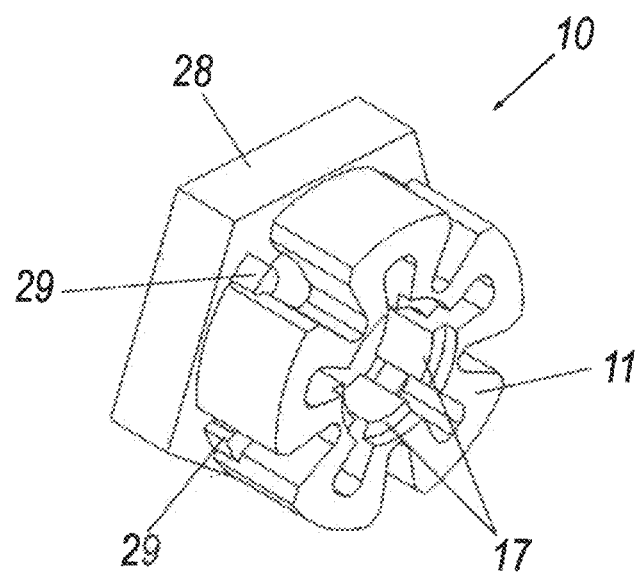
FIG. 9a shows an isometric view of another embodiment of a braking device.
Figure 9B:
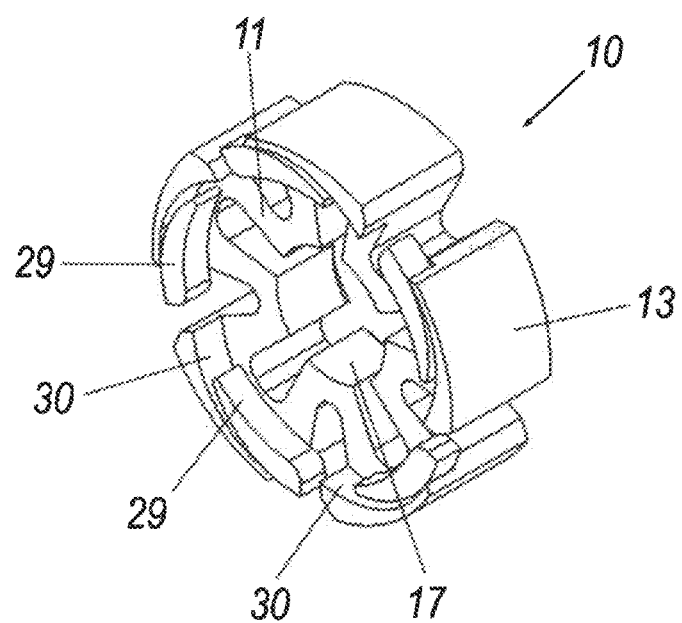

FIGS. 9a and 9b show another embodiment of a braking device 10 which can be manipulated with respect to its braking force. The braking device 10 comprises a base body 11, which in turn is comparable in terms of its basic structure with those of FIGS. 2a, b, c and 3a, b.

A rotary actuating device 28 is in engagement with the base body 11, which is also constructed in an annular manner with respect to its basic structure, wherein the armature shaft to be braked by the braking device 10 is guided centrally through the rotary actuating device 28. A plurality of spreading elements 29 are formed circumferentially on a surface facing the base body 11.

FIG. 9a shows an isometric top view of the base body 11 in the foreground and the rotary actuating device 28 engaging the base body 11 from this viewing direction from the rear. FIG. 9b shows an isometric sectional view of the arrangement comprising the base body 11 and the rotary actuating device 28, wherein only the spreading elements 29 of the rotary actuating device 28 are visible in FIG. 9b. In this view, the rear side of the base body 11 facing the rotary actuating device 28 and the shape of the spreading elements 29 are visible.

In this embodiment, the outer protruding sections 13 protrude in the axial direction beyond the inner part of the base body 11 on the rear side of the base body 11, so that a projecting edge is formed by the protruding sections 13. This edge is provided with a guide bevel 30 in each case in the region of the protruding sections 13. Corresponding to the shape of these guide bevels 30, the spreading elements 29 are shaped eccentrically on their radially outward-facing side. The shape of the spreading element 29 and the guide bevel 30 leads to a spreading of the base body 11 upon rotation of the base body 11 relative to the rotary actuating device 28. A relative rotational movement of these two elements to each other can thus be used to more or less spread the base body 11 apart, thus varying the braking effect on an armature shaft leading through the base body 11.

Figure 10:
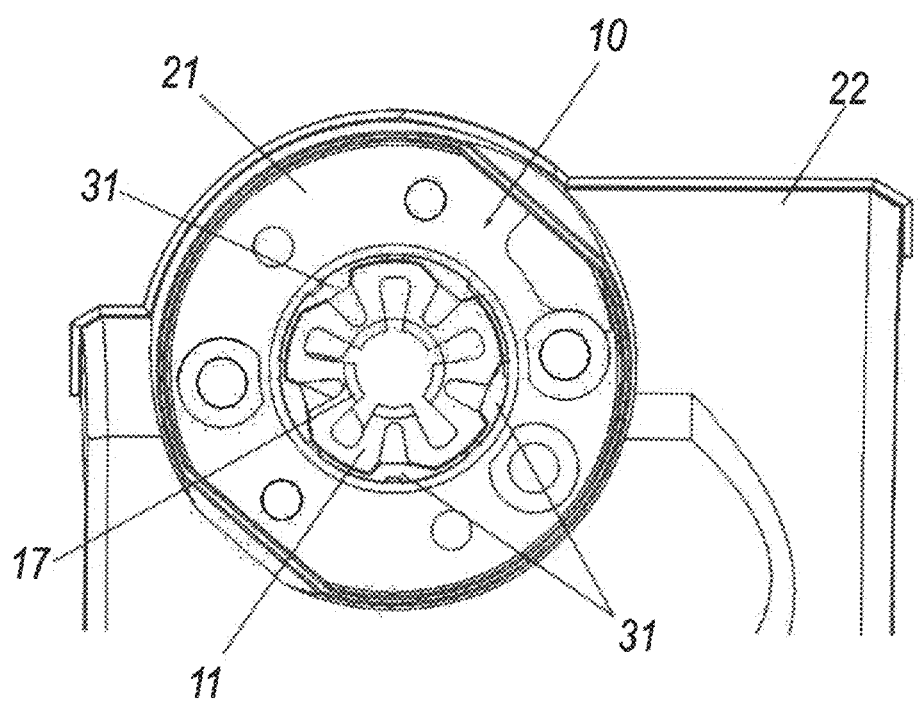
FIG. 10 shows an isometric view of another embodiment of a braking device.

FIG. 10 shows a further exemplary embodiment of a braking device 10, which exploits the principle illustrated in the exemplary embodiment of FIGS. 9a and 9b.

In this case, a braking device similar to FIG. 6b is integrated in a motor bearing shell 22 with motor bearing plate 21. In the embodiment of FIG. 10, the drive motor 1 is applied from the rear to the motor bearing plate 21, so that its armature shaft 5 protrudes with worm 6 forward in the illustrated drawing. The braking device 10 is guided with its base body 11 from the front over the armature shaft 5 and is accommodated in a recess of the motor bearing plate 21.

In this embodiment, compression elements 31 are formed on the outer periphery of the receptacle of the base body 11 on the motor bearing plate 21 instead of spreading elements 29. Analogously to the spreading elements 29, the compression elements 31 are also formed eccentrically with respect to their radial progression. Guide bevels 30 are again formed on the outside in this embodiment on the base body 11. Depending on the direction of rotation of the armature shaft guided through the base body 11 of the braking device 10, a torque is exerted on the base body 11, which leads to a twisting of the body 11 relative to the compression elements 31. In one direction of rotation of the armature shaft, the base body 11 is able to relax so far that it only brakes the armature shaft with its spring force. In the other direction of rotation, the base body 11 is compressed by running up against the guide bevels 30 which are the outer ones in this case, thus amplifying the braking effect.

Figure 11A:
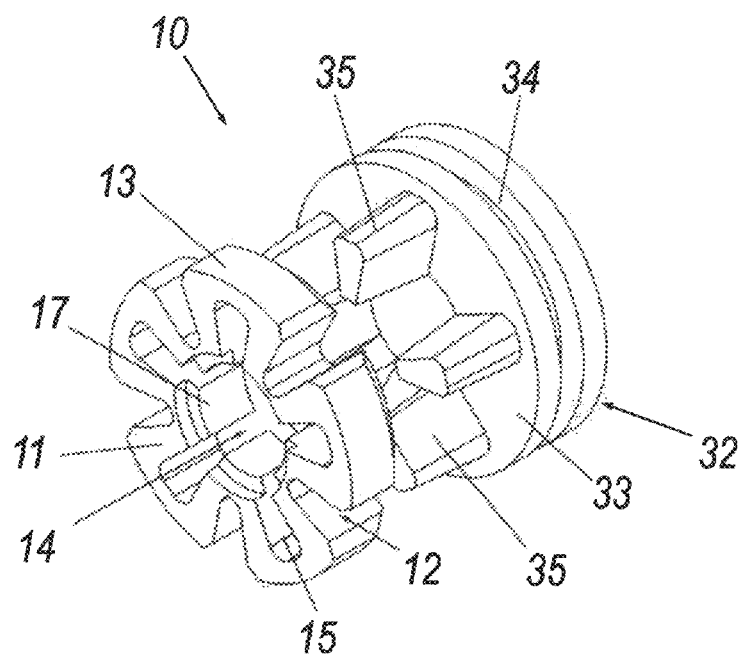
FIG. 11a shows an isometric view of another embodiment of a braking device.
Figure 11B:
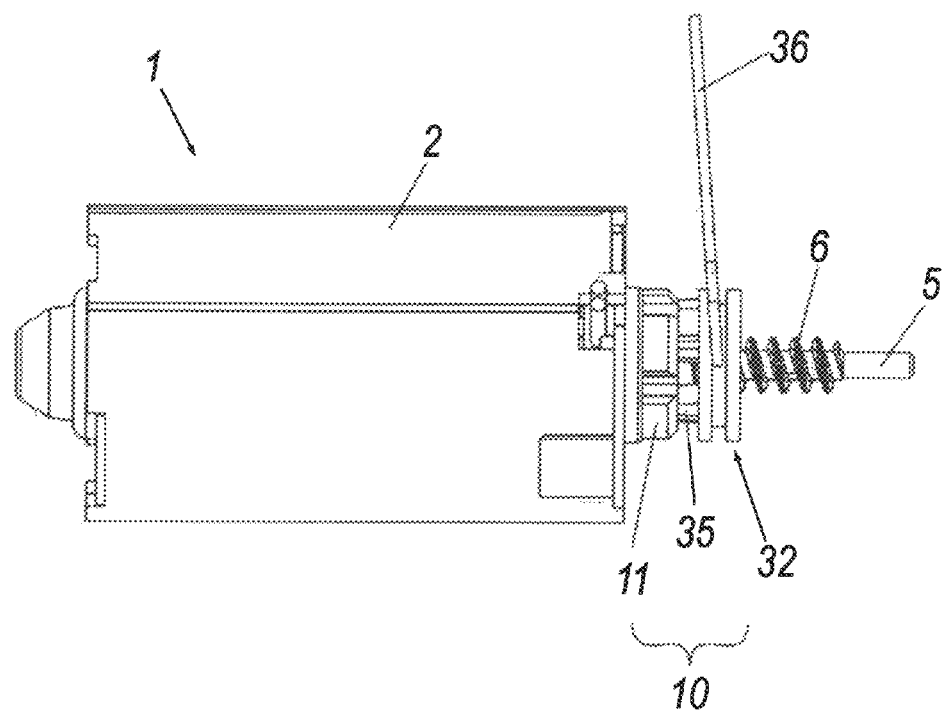
FIG. 11b shows a side view of the braking device of FIG. 11a, mounted on a drive motor.

In FIGS. 11a and 11b, another embodiment of a braking device 10 is shown, which can be varied in its braking force. FIG. 11a shows the braking device 10 initially separate from a drive motor in an isometric view. FIG. 11b shows the braking device 20 finally in interaction with a drive motor 1.

Similarly to the braking device 10 shown in FIGS. 9a and 9b, the braking device 10 shown in FIGS. 11a and 11b also includes a base body 11 which cooperates with an actuating device. The actuating device is formed in this embodiment as an axial actuating device 32 which is displaced relative to the base body 11 for changing the braking effect in the axial direction.

The axial actuating device 32 is in turn of annular construction with a disk-like base 33, wherein the axial actuating device 32 is arranged with its base substantially parallel to the base body 11 together on the armature shaft 5 to be braked. The base 33 is provided with a circumferential groove 34 into which a pivot lever 36 engages with a U-shaped fork to enable the movement of the actuating device 32 axially on the armature shaft 5.

On the side of the base 33 facing the base body 11, a number of protruding pins 35 is formed, which engage in the inner incisions 15 of the base body 11. In FIG. 11a, the base body 11 and the axial actuating device 32 are shown spaced apart from each other so as to enable representation of the design of the two components more clearly.

The pins 35 are conically shaped. They taper starting from the base 33 towards the free end. If the pins 35 engage in the inner incisions 15, they spread apart the base body 11 evenly over its entire circumference, and more so the further the pins 35 are inserted into the base body 11.

Figure 12A:
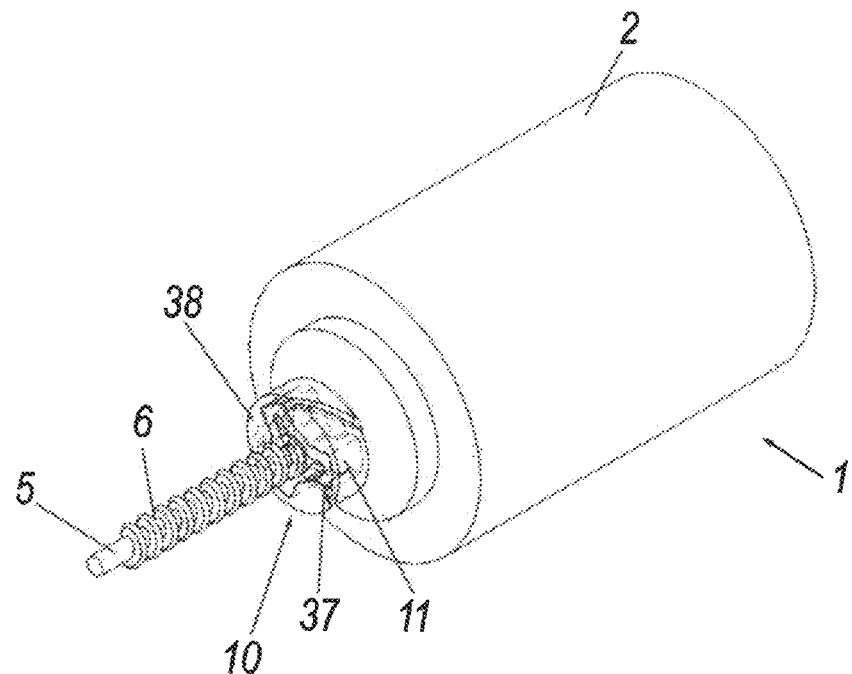
FIGS. 12a to 12d show various illustrations of another embodiment of a braking device.
Figure 12B:
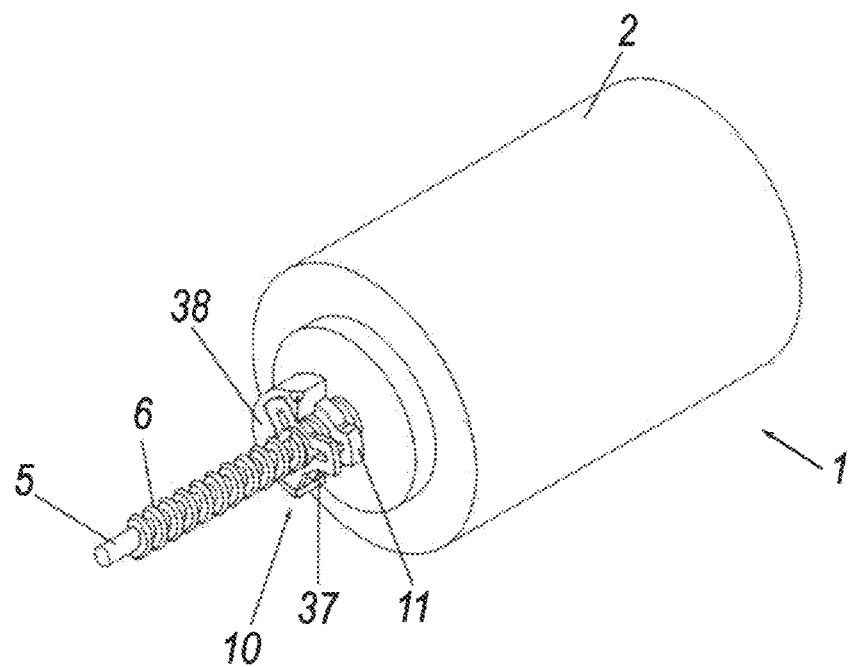
Figure 12C:
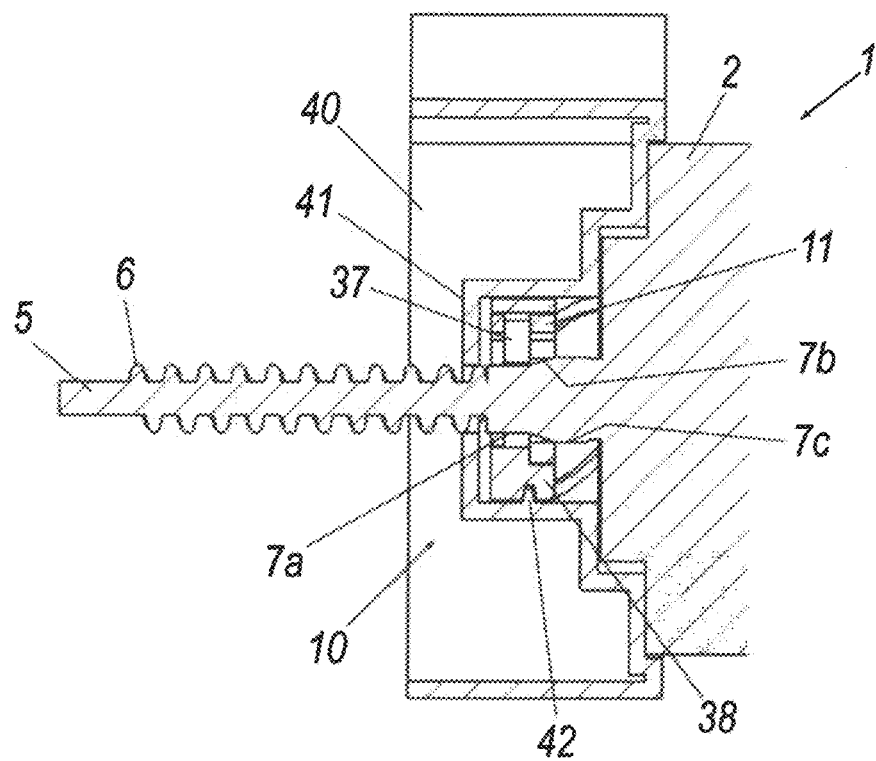

Another embodiment of a braking device 10 which varies the braking force dependent on the direction of rotation is shown in FIGS. 12a-d. FIGS. 12a and 12b show the braking device 10 arranged on an armature shaft 5 of a drive motor 1 in each case an isometric view. In order to clarify the structure of the braking device 10, the braking device 10 is shown partially transparent in FIG. 12a and partially intersected in FIG. 12b. In FIGS. 12c and d, sections are represented by the region of the braking device 10 which reproduces the braking device 10 at different rotational directions of the armature shaft 5 of the drive motor 1.

In this embodiment, the braking device 10 comprises a base body 11 which is formed comparable to the base bodies 11 of the braking device 10 according to FIG. 3a. An embodiment with more than the three protruding sections 13 which are illustrated here is also conceivable. The base body 11 is held parallel to a comparably designed control disk 37 in a common cage 38. The common cage 38 fixes the base body 11 and the control disk 37 spaced parallel to each other and rotationally fixed to each other.

The control disk 37, like the base body 11, has braking surfaces which are pressed resiliently onto the armature shaft 5. However, the braking forces exerted by the control disk 37 on the armature shaft 5 are lower than those of the base body 11. In addition, the base body 11 and the control disk 37 are designed for different axle diameters. Accordingly, the armature shaft 5 is profiled in the axle section 7, in which the braking device 10 acts, in such a way that a control section 7a in the region of the control disk 37 has a smaller diameter than a brake section 7c, which is assigned to base body 11. Control section 7a and brake section 7c converge into each other to form a cone-shaped section, hereinafter referred to as freewheeling section 7b. The profiling of the axle section 7 into the three mentioned sections 7a-c can be seen in FIGS. 12c and 12d.

In the installed state of the drive motor 1 and the braking device 10, which is shown in FIGS. 12c and d, the cage 38 is arranged in a hollow-cylindrical receptacle 41 of a motor mount 40 in which the cage 38 can rotate and in which it can move axially within a certain path of displacement. In the hollow-cylindrical receptacle 41, a threaded web 42 is formed in an inwardly projecting manner on the periphery which engages in the oblique groove 39 of the cage 38. As a result, the rotational movement and the axial movement of the cage 38 are coupled in such a way that upon rotation of the cage 38 relative to the motor mount 40 the cage 38 moves axially.

The two sectional views of FIGS. 12c and d differ in the direction of rotation of the motor shaft 5, which is symbolized in each case by a direction of rotation arrow. In the situation illustrated in FIG. 12c, the cage 38 is positioned maximally in the hollow-cylindrical receptacle 41 (to the left in the figure). In this position, the control disk 37 is in contact with the control section 7a of the armature shaft 5 and undergoes a corresponding torque, by means of which the cage 38 is held in the position shown. In this position, the base body 11 is positioned by the cage 38 in such a way that it is located fully or at least partially in the conical freewheeling section 7b of the armature shaft 5. The base body 11 thus experiences no or only a very small braking effect. In summary, only a small braking effect on the armature shaft 5 is produced in this direction of rotation of the armature shaft 5.

Figure 12D:
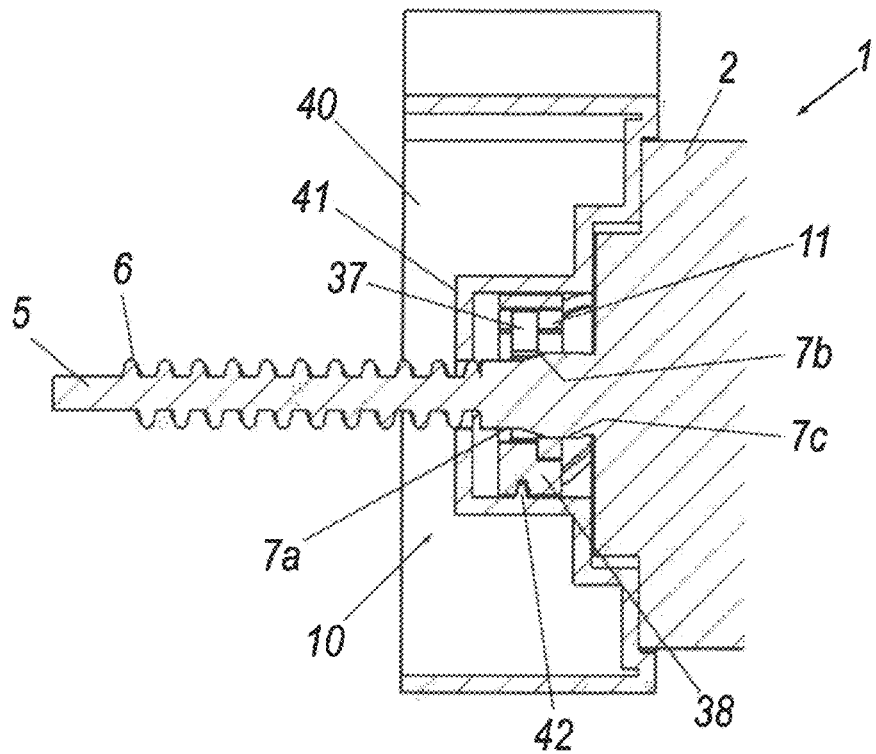

If, however, the direction of rotation of the armature shaft 5 is reversed, as shown in FIG. 12d, the cage 38 experiences a torque due to the control disk 37, which, due to the interplay of the oblique groove 39 and the threaded web 42, shifts the cage 38 in the direction of the motor housing 2. As a result of this shift, the base body 11 is pushed by the freewheeling section 7b onto the brake section 7c, where it experiences a stronger braking effect. The resulting torque pushes the cage 38 further in the direction of the motor housing 2 until the base body 11 acts completely with its braking elements 17 in the brake section 7c in a braking manner the armature shaft 5. In this direction of rotation of the armature shaft 5, a significantly greater braking effect than in the opposite direction of rotation is thus achieved.

If the armature shaft 5 again changes the direction of rotation, the torque acting in the reverse direction from the base body 11 and the control disk 37 leads to the consequence that the cage 38 moves into the hollow-cylindrical receptacle 41 again until the state with little braking effect as shown in FIG. 12c Is achieved.

Figure 13:
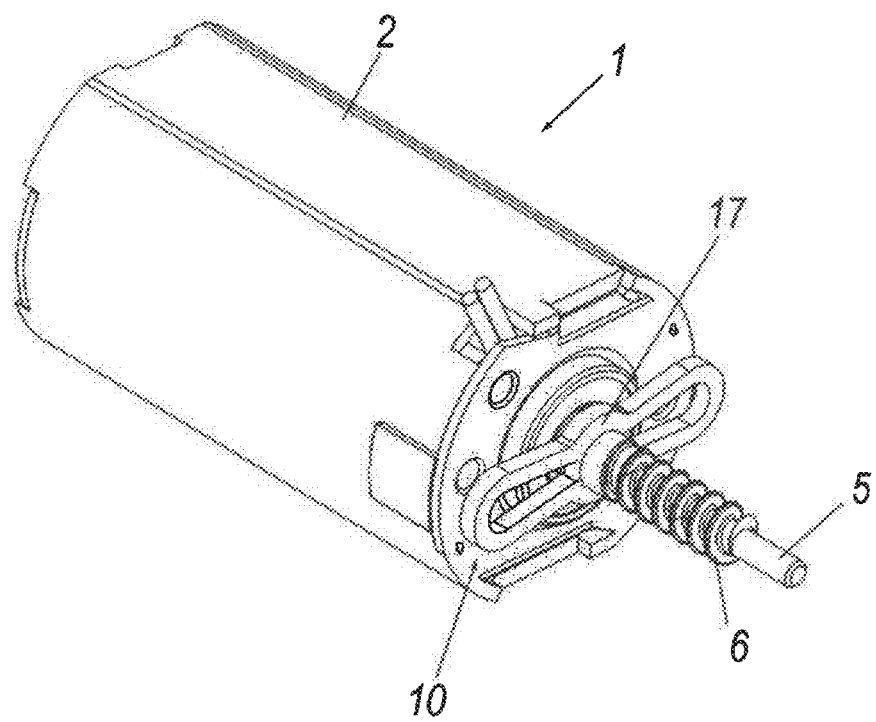
FIG. 13 shows an isometric view of another embodiment of a braking device, mounted on a drive motor, and FIGS. 14 and 15 each show an isometric view of another embodiment of a braking device.

FIG. 13 shows a further exemplary embodiment of a braking device 10 according to the application. The braking device 10 is shown in an isometric view mounted on an armature shaft 5 of a drive motor 1. The braking device 10 has a loop-shaped base body 11, which in a central region provides two approximately semicircular brake elements 17, which act on an axle section 7 of the armature shaft 5. The two braking elements 17 are pressed against each other via two lateral arc-shaped spring sections, by means of which the braking effect on the axle shaft 6 is obtained. With regard to the basic structure, the braking device 10 thus corresponds approximately to the braking devices of FIGS. 2a-c and 3a and b. Again, braking elements 17 and the spring sections producing the spring effect are made of the same material and in an integral manner. As a material for the braking device 10 of FIG. 15, a metal such as zinc, e.g. in the form of zinc die casting, or aluminum or steel can be considered in addition to plastic.

The smaller number of only two braking elements 17 in this case compared to the previously illustrated embodiments, which have a number of three to six braking elements 17, requires a higher spring force which must be provided by the spring sections. For this reason, the illustrated braking device 10 is formed thinner in the axial direction, the spring sections are of greater material thickness in the radial direction, however, so that it is possible to exert the required pressing force on the braking elements 17.

Figure 14:
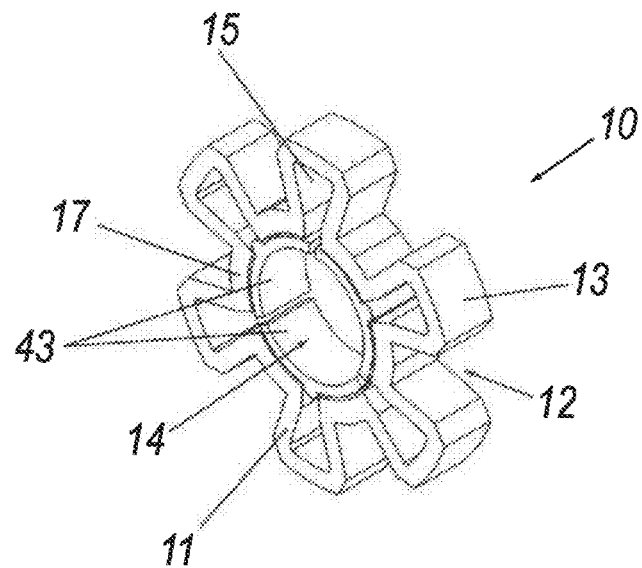
Figure 15:
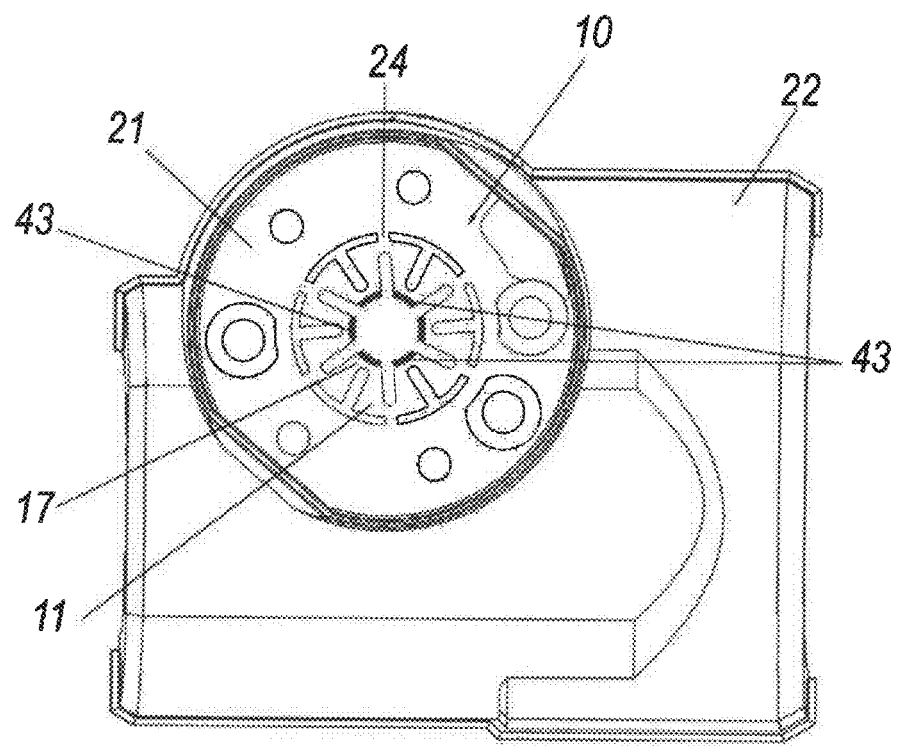

In FIGS. 14 and 15, alternative embodiments of braking devices 10 are shown. The braking device 10 shown in FIG. 14 is the same as that shown in FIGS. 3a and 3b. In a base body 11, inner and outer incisions 15, 12 are introduced again, but in such a way that it is not the sides of the incision that extend parallel to each other, but the remaining material of the body 11, i.e. the inner part of the body 11 and the protruding sections 13 each have the same material strength. The result is a structure that corresponds more to a band which is selected to be closed to a ring.

The braking device 10 of FIG. 14 could be used directly with the inwardly facing braking elements 17 of the base body 11 as braking surfaces acting on an axle. In the example shown, three ring segments 43, which deviate therefrom, are used which are held in a rotationally fixedly manner in the base body 11 and provide braking surfaces on their inner side. With such a configuration, the material of the braking surfaces can be selected independently of the material of the base body 11. As a result, for example, the use of a material which is as hard as possible, but is not necessarily so resilient, is possible for the braking surfaces relative to the base body 11.

FIG. 15 shows a braking device 10 integrated in a motor bearing shell 22 which is comparable in terms of its basic structure with the braking device 10 shown in FIG. 6.

In contrast to the braking device of FIG. 6, annular segments 43 are also fitted in this case on the braking elements 17 on the inside, which may be made of a different material than the base body 11 of the braking device 10 or the motor bearing shell 22. If appropriate, the ring segments 43 may be integral with the motor bearing shell 22 or be formed on the base body 11, for example in a multi-component injection-molding process. It is also possible to first manufacture the ring segments 43 separately and then, inserted into the injection mold of the motor bearing shell 22, injection-mold the motor bearing shell 22 to the ring segments 43.

What is claimed is:

1. A braking device for an electric drive motor, said electric drive motor having an axle section of an armature shaft, said braking device comprising:
    an annular base body having a central opening in a relaxed state of the braking device smaller than a diameter of the axle section of the armature shaft so that the braking device is seated with pretension on the axle section of the armature shaft, an outer circumference and an inner circumference;
    a braking element; and
    an energy storage device configured to apply a braking force permanently onto a friction surface of the braking element,
    wherein the energy storage device and the braking element are integrally formed,
    wherein the base body includes at least one first incision configured to originate from the central opening thereby forming the friction surface,
    wherein the base body includes at least one second incision configured to originate from the outer circumference of the base body and not extend all the way to the central opening,
    wherein the at least one first incision is offset from the at least one second incision, thereby providing a spring action in a radial direction.

2. The braking device of claim 1, wherein the energy storage device and the braking element are made from different materials.

3. The braking device of claim 2, wherein the braking element is made from a material that is harder than the material from which the energy storage device is made.

4. The braking device of claim 2, wherein the braking element is made from a material that is less resilient than the material from which the energy storage device is made.

5. The braking device of claim 1, wherein the base body includes a plurality of first incisions and/or a plurality of second incisions which are arranged obliquely.

6. The braking device of claim 1, wherein the central opening has an inner surface configured to form the friction surface.

7. The braking device of claim 1, wherein the base body includes a plurality of first incisions and/or a plurality of second incisions which are arranged in a star shape.

8. The braking device of claim 7, wherein the plurality of first incisions and the plurality of second incisions alternate circumferentially.

9. The braking device of claim 1, wherein the base body is made in a disk-shaped manner of a solid material.

10. The braking device of claim 1, wherein the base body is made of zinc, bronze or PEEK.

11. The braking device of claim 1, wherein the braking element includes a surface to define the friction surface.

12. The braking device of claim 1, constructed integrally with a motor bearing plate.

13. The braking device of claim 1, constructed integrally with a motor bearing shell.

14. The braking device of claim 1, constructed for integration in the electric drive motor.

15. A braking device for an electric drive motor, said electric drive motor having an axle section of an armature shaft and at least one projection, said braking device comprising:
    an annular base body having a central opening in a relaxed state of the braking device smaller than a diameter of the axle section of the armature shaft so that the braking device is seated with pretension on the axle section of the armature shaft, an outer circumference and an inner circumference;
    a braking element; and
    an energy storage device configured to apply a braking force permanently onto a friction surface of the braking element,
    wherein the energy storage device and the braking element are integrally formed,
    wherein the base body includes at least one first incision configured to originate from the central opening thereby forming the friction surface,
    wherein the base body includes at least one second incision configured to originate from the outer circumference of the base body and not extend all the way to the central opening, wherein the at least one first incision is offset from the at least one second incision, thereby providing a spring action in a radial direction, wherein the at least one projection of the electric motor engages the at least one second incision thereby securing the braking device against rotation.

16. The braking device of claim 15, wherein the base body includes a plurality of first incisions and a plurality of second incisions and the motor includes a plurality of projections such that each one of the plurality of projections extends into a corresponding each one of the second incisions.

17. A braking device for an electric drive motor, said electric drive motor having an axle section of an armature shaft and at least one holding or latching projection, said braking device comprising:

an annular base body having a central opening in a relaxed state of the braking device smaller than a diameter of the axle section of the armature shaft so that the braking device is seated with pretension on the axle section of the armature shaft, an outer circumference and an inner circumference;

a braking element; and an energy storage device configured to apply a braking force permanently onto a friction surface of the braking element, wherein the energy storage device and the braking element are integrally formed, wherein the base body includes at least one incision configured to originate from the central opening towards an outer periphery area, thereby forming the friction surface, wherein the base body is circumferentially closed in the outer periphery area with at least one radially protruding section extending from the circumferentially closed outer periphery area, wherein the at least one holding or latching projection of the electric motor engages the at least one radially protruding section, thereby securing the braking device against rotation.

18. The braking device of claim 17, wherein the base body includes a plurality of the radially protruding sections and the motor includes a plurality of holding or latching projection such that each one of the plurality of holding or latching projections cooperates with a corresponding each one of the radially protruding sections.

19. The braking device of claim 17, wherein the base body is made of a sheet metal material, said base body including a plurality of the incisions arranged to define interposed spring tongues having free ends with an axially extending section configured to define the friction surface.

* * * * *